M. LAMMERS.
MILKER HEAD.
APPLICATION FILED JUNE 11, 1918.

1,328,880. Patented Jan. 27, 1920.

WITNESSES:

INVENTOR
Matthew Lammers
BY
ATTORNEY

UNITED STATES PATENT OFFICE.

MATTHEW LAMMERS, OF SHEBOYGAN FALLS, WISCONSIN.

MILKER-HEAD.

1,328,880.  Specification of Letters Patent.  Patented Jan. 27, 1920.

Application filed June 11, 1918. Serial No. 239,387.

*To all whom it may concern:*

Be it known that I, MATTHEW LAMMERS, a citizen of the United States, and resident of Sheboygan Falls, in the county of Sheboygan and State of Wisconsin, have invented certain new and useful Improvements in Milker-Heads; and I do hereby declare that the following is a full, clear, and exact description thereof.

This invention relates to milking machines and more particularly to what is commonly known as a milker head.

In milking machines of present construction a suction pump is commonly employed having a tubular connection with teat cups adapted to be attached to a cow. Intermediate of the pump and teat cups a milker head is used for regulating the rarefaction of the air to cause suction upon the teat whereby milk is extracted from the cow and discharged into a pail or receiver associated with the milker head.

It is an object of the present invention to provide a milker head of simple, sanitary and economical construction and efficient in operation.

A further object of the invention is to provide a milker head with automatically actuated valves at its inlet and discharge whereby the flow of milk in the proper direction is insured.

Another object is to provide a milker head with means whereby the flow of milk can be observed without necessitating the removal of the head from the receiver.

A still further object resides in the provision of a milker head in which the different parts are readily disassembled for cleaning the same.

With these and other objects in view which will be apparent as the description proceeds, my invention resides in the novel features of construction, combination and arrangement of parts as hereinafter described and defined by the appended claims, it being understood that changes in the precise embodiment might be made by those skilled in the art without departing from the spirit of the invention.

This invention in one practical form in which it may be embodied is illustrated in the accompanying drawing in which:—

Figure 1:
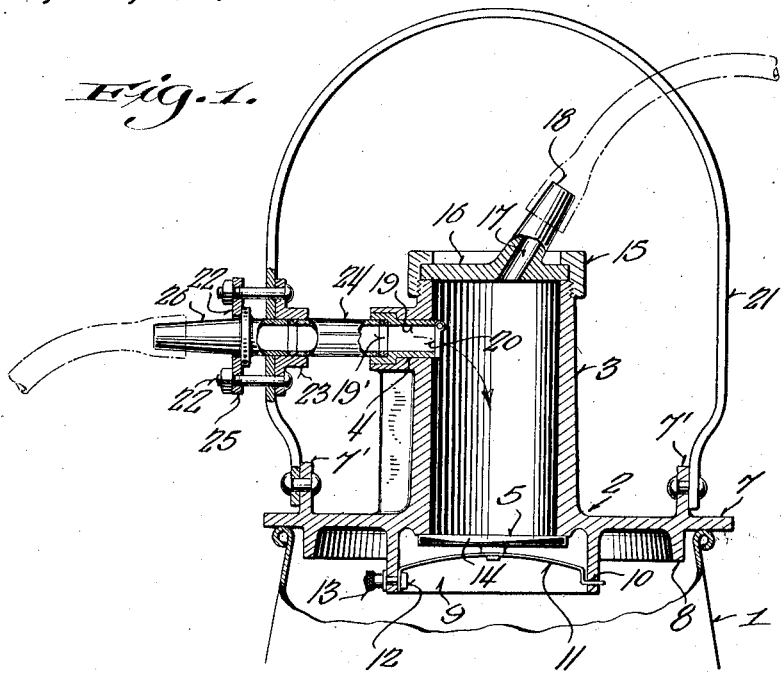
Figure 2:
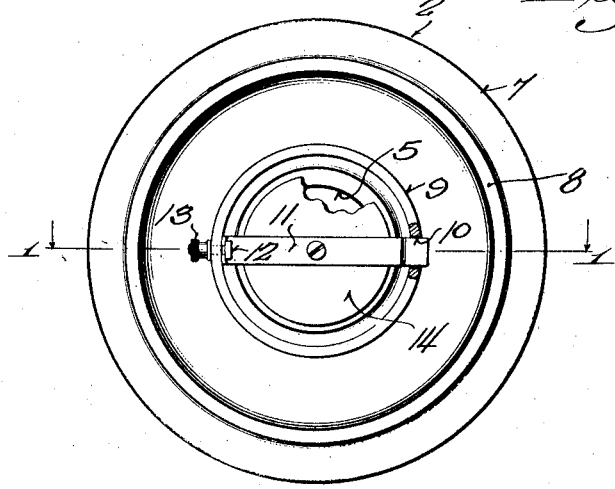

Figure 1 is a section view through the invention as indicated by the line 1—1 of Fig. 2, and Fig. 2 is a bottom plan view with parts broken away and in section.

Referring now more particularly to the accompanying drawing 1 designates a milk pail having positioned thereon a milker head 2 consisting of a hollow shell 3 which forms a chamber having an inlet 4, and a discharge orifice 5 at its lower end. Extending laterally from the lower end of the shell 3 and adapted to rest upon the pail 1, forming a cover therefor, is a flange 7 provided with a downwardly extending guard rim 8 to insure proper centering of the milker head with relation to the pail. Adjacent the discharge orifice of the chamber is a circular apron 9 depending from the flange 7 and having provided therein a slot 10 to receive one end of a flat spring 11, the opposite end of which is secured to the apron by a bolt 12 having threaded upon its outer end a knurled cap 13. Secured to the spring 11 is a valve 14 adapted to normally close the discharge orifice 6.

By mounting the valve 14 in the foregoing manner it will be seen that, upon relieving the pressure within the chamber formed by the shell 3 which holds the valve open and discharges the milk into the receiver, the valve will be instantly closed by action of the spring 11. Furthermore by removing the bolt 12 the valve is readily disassembled for cleaning.

The upper end of the shell 3 is exteriorly threaded to receive a locking ring 15 to clamp the cover 16, forming a closure for the chamber, to the shell 3. The cover 16 has formed therein an inlet 17 provided with an inclined nipple 18 to which is attached a hose connecting the milker head with a suction pump (not shown). Fitted in the inlet 4 is a thimble 19 to which is hinged at its inner end a gate valve 20 adapted to close the inlet port.

The flange 7 has formed thereon adjacent its periphery ears 7' to which is attached a handle 21 provided with an opening in alinement with the inlet 4 of the shell 3. Carried upon the handle by means of bolts 22 passing therethrough is a bracket 23 adapted to receive one end of a sight feed glass 24 having its opposite end positioned within the thimble 19 and abutting a washer 19' thereby forming a seal between the thimble and the sight feed.

Carried upon the outer ends of the bolts 22 is a retaining ring 25 adapted to fit over a hose nipple 26 and abut a flange provided thereon. As clearly shown in Fig. 1 the rearward extension of the nipple 26 is projected through the opening in the handle 21 and fitted into the bracket 23 where it abuts a washer positioned between it and the sight feed glass to form a proper seal. By this construction it will be seen that the nipple 26 together with the sight feed 24 and the thimble 19 are all rigidly clamped in their proper position and that upon removal of the nuts from the bolts 22 these different parts are readily removed for cleaning or to replace the sight feed should the same become damaged.

In permitting the cover 16 to be rotatably adjusted upon the shell 3 the milker head can be placed in any position with relation to the suction pump and the nozzle 18 adjusted in the proper direction thereby preventing the hose connection from becoming crimped which would effect the operation of the milker.

In operation it will be seen that upon removing air from the chamber of the shell 3 through the outlet 17 the valve 20 will necessarily be opened and a suction exerted upon the inlet which will cause milk to flow from the teat cups into said chamber whereupon air is admitted through the outlet 17 which will cause the valve 20 to close and the valve 14 to open whereupon milk drawn into the chamber is discharged through the orifice 5 to the pail or receiver.

What I claim is:

1. A milker head comprising a hollow shell having an inlet and a discharge orifice, a one-way valve for the inlet, a rotatably adjustable cover for the shell having an outlet, a flange extending laterally from the shell, an apron depending from the flange, a spring detachably connected to the apron, and a valve carried by the spring and adapted to close the discharge orifice.

2. A milker head comprising a hollow shell having an inlet and a discharge orifice, a valve for the inlet, a cover for the shell having an outlet, a flange extending laterally from the shell, an apron depending from the flange, a valve detachably carried by the apron and adapted to close the discharge orifice, a handle attached to the flange, a hose nipple carried by the handle, and a sight feed connecting the hose nipple with said inlet.

3. A milker head comprising a hollow shell having an inlet and a discharge orifice, a rotatably adjustable cover for the shell provided with an outlet, a spring controlled valve adapted to close the discharge orifice, a thimble fitted into said inlet, a valve carried by one end of the thimble, a flange extending laterally from the shell, a handle carried by the flange, a bracket secured to the handle, a nipple fitted into the bracket, a sight feed connecting the bracket and thimble, and means for clamping the sight feed between the thimble and nipple.

In testimony that I claim the foregoing I have hereunto set my hand at Sheboygan Falls, in the county of Sheboygan, and State of Wisconsin.

MATTHEW LAMMERS.